United States Patent
Hu et al.

(10) Patent No.: US 12,474,862 B2
(45) Date of Patent: Nov. 18, 2025

(54) METHOD, DEVICE, AND COMPUTER PROGRAM PRODUCT FOR RECOVERING OBJECT IN STORAGE SYSTEM

(71) Applicant: Dell Products L.P., Round Rock, TX (US)

(72) Inventors: Shi Hu, Shanghai (CN); Dong Wang, Shanghai (CN); Vicky Huiqin Sheng, Shanghai (CN); Alex Xingang Wang, Suzhou (CN); Emily Kang, Shanghai (CN); Dandan Zhang, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/513,324

(22) Filed: Nov. 17, 2023

(65) Prior Publication Data

US 2025/0094077 A1    Mar. 20, 2025

(30) Foreign Application Priority Data

Sep. 15, 2023   (CN) .......................... 202311201530.8

(51) Int. Cl.
G06F 3/06         (2006.01)

(52) U.S. Cl.
CPC .......... *G06F 3/0655* (2013.01); *G06F 3/0604* (2013.01); *G06F 3/0673* (2013.01)

(58) Field of Classification Search
CPC ........... G06F 12/0246; G06F 15/17331; G06F 2212/2022; G06F 2212/7201; G06F 3/061; G06F 3/0611; G06F 3/0659; G06F 3/0661; G06F 3/0679; G06F 9/3004
See application file for complete search history.

(56) References Cited

U.S. PATENT DOCUMENTS

2020/0159452 A1 *   5/2020   Cheru .................... G06F 3/067

* cited by examiner

*Primary Examiner* — Yong J Choe
(74) *Attorney, Agent, or Firm* — Amin, Turocy & Watson, LLP

(57) ABSTRACT

The subject technology relates to recovering an object in a storage system. For instance, an object in a storage system is recovered by parsing object metadata associated with the object from a log in the storage system and storing the parsed object metadata in a storage space. In response to receiving a request to recover the object, the parsed object metadata from the storage space is retrieved. A linkage can be reestablished to a chunk corresponding to the object based on the retrieved object metadata. In this way, space reclamation is not impacted during recovery for the object, thereby increasing the space utilization. Furthermore, the time spent in the recovery process is reduced, and the success rate of object recovery is increased.

20 Claims, 7 Drawing Sheets

METHOD, DEVICE, AND COMPUTER PROGRAM PRODUCT FOR RECOVERING OBJECT IN STORAGE SYSTEM

RELATED APPLICATION

The present application claims the benefit of priority to Chinese Patent Application No. 202311201530.8, filed on Sep. 15, 2023, which application is hereby incorporated into the present application by reference herein in its entirety.

TECHNICAL FIELD

Embodiments of the present disclosure generally relate to the field of storage, and more particularly, to a method, a device, and a computer program product for recovering an object in a storage system.

BACKGROUND

Object storage is an architecture and technique for data storage in which, in contrast to traditional block storage and file storage, objects are used as the basic storage units, and each object has its unique identifier (e.g., a globally unique universal resource locator (URL) and includes the data per se and metadata associated therewith.

Object storage has been widely applied in data-intensive scenarios such as cloud storage, big data analysis, backup, archiving, and the like. Through object storage, massive unstructured data, such as images, audios, videos, texts, or the like, can be stored and managed in an efficient, reliable, and extensible manner.

SUMMARY

Embodiments of the present disclosure provide a solution for recovering an object in a storage system.

In a first example embodiment of the present disclosure, a method for recovering an object in a storage system is provided. The method includes: parsing object metadata associated with the object from a log in the storage system; storing the parsed object metadata in the storage space; receiving a request to recover the object; in response to receiving the request, retrieving the parsed object metadata from the storage space; and reestablishing a linkage to a chunk corresponding to the object based on the retrieved object metadata.

In another example embodiment of the present disclosure, a device for recovering an object in a storage system is provided. The device includes a processor and a memory, where the memory is coupled to the processor and has instructions stored thereon that, when executed by the processor, cause the device to perform the following actions: parsing object metadata associated with the object from a log in the storage system; storing the parsed object metadata in the storage space; receiving a request to recover the object; in response to receiving the request, retrieving the parsed object metadata from the storage space; and reestablishing a linkage to a chunk corresponding to the object based on the retrieved object metadata.

In still another example embodiment of the present disclosure, a computer program product is provided. The computer program product is tangibly stored on a non-transitory computer-readable storage medium and includes computer-executable instructions that, when executed, cause a computer to perform the method or process according to the embodiments of the present disclosure.

It should be noted that the section of Summary is provided to introduce a series of concepts in a simplified manner, and these concepts will be further described in the Detailed Description below. The section of Summary is neither intended to identify key features or necessary features of the present disclosure, nor intended to limit the scope of the present disclosure.

BRIEF DESCRIPTION OF THE DRAWINGS

By description of embodiments of the present disclosure in further detail with reference to the accompanying drawings, the above and other objectives, features, and advantages of the present disclosure will become more apparent, in which.

Throughout all the drawings, the same or similar reference numerals generally represent the same or similar elements.

DETAILED DESCRIPTION

Figure 1:
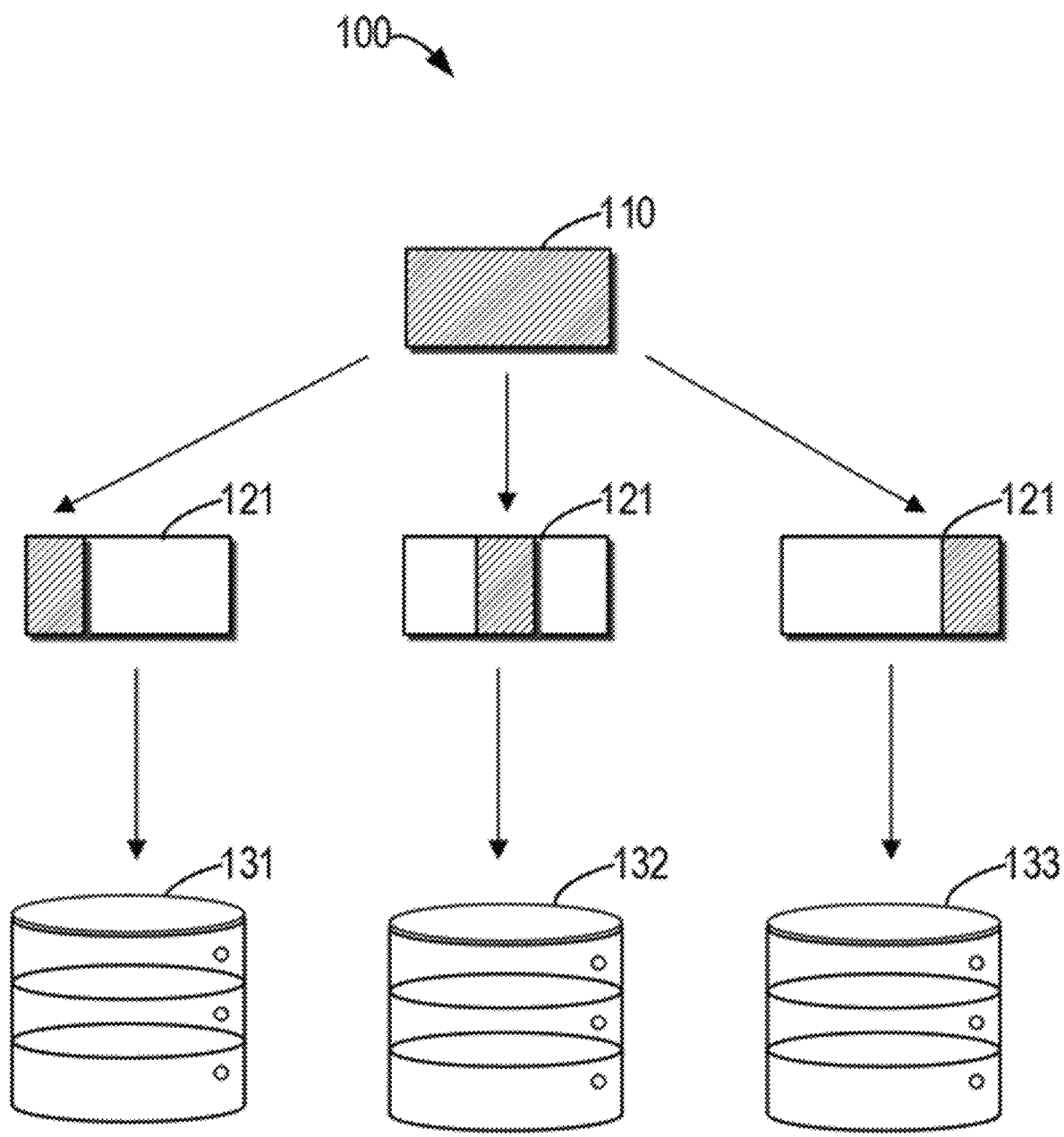
FIG. 1 illustrates a schematic diagram of an example object storage system in which a method and/or a process according to embodiments of the present disclosure can be implemented.
Figure 2:
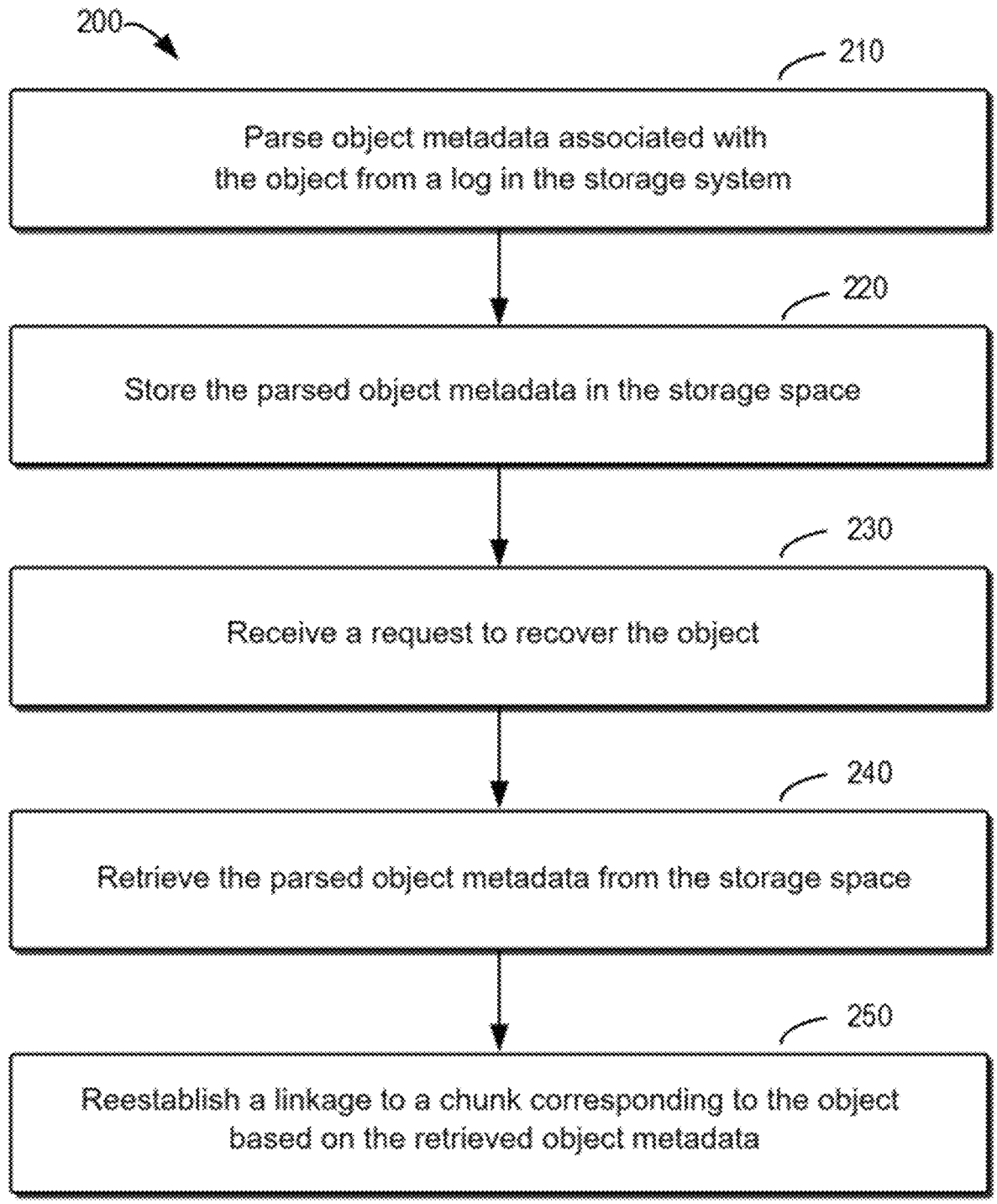
FIG. 2 illustrates a flow chart of a method for recovering an object in a storage system according to an embodiment of the present disclosure.

The embodiments of the present disclosure will be described below in further detail with reference to the accompanying drawings. Although certain embodiments of the present disclosure are illustrated in the accompanying drawings, it should be understood that the present disclosure can be implemented in various forms and should not be construed as being limited to the embodiments set forth herein. Rather, these embodiments are provided for more thorough and complete understanding of the present disclosure. It should be understood that the accompanying drawings and embodiments of the present disclosure are for illustrative purposes only, and are not intended to limit the protection scope of the present disclosure.

In the description of embodiments of the present disclosure, the term "include" and its variations should be understood as open-ended inclusion, i.e., "including but not limited to." The term "based on" should be understood as "based at least in part on." The term "an embodiment" or "the embodiment" should be understood as "at least one embodiment." The terms "first," "second," and the like may refer to different or identical objects, unless otherwise specifically indicated.

Compared with traditional storage, object storage can satisfy the storage and management requirements of large-scale, distributed, and unstructured data, while having advantages such as flexible extendibility, simplified management, high availability, high performance, and low cost. However, use of object storage also brings about some problems. For example, some current object storage systems lack a recycle bin design and therefore do not enable the un-delete operation. These problems will be further explained in detail below.

In some examples, during traditional object recovery, space reclamation has to be completely suspended for several weeks or several months. This is because the raw data in the chunk will be permanently deleted during space reclamation. In the case where the raw data in the chunk is deleted, the object on this chunk will be unrecoverable. For a user with high capacity utilization, the fact that space reclamation is in a disabled state for a long period of time will lead to disadvantages such as storage space wastage and increased storage cost.

In some other examples, the traditional recovery process relies on parsing of history logs and is based on a list provided by a user. During update of this list, there is no logic to continue or resume log parsing. As a result, during update of such a list, the recovery operation has to start over, which means it is impossible to reuse the result of log parsing. Furthermore, the more the time spent in the recovery process, the less the chance of data saving, as the chunks will be reclaimed in the background.

In summary, traditional object storage systems lack the recycle bin design, and when an object is deleted, the system will mark the object as deleted and compress the previous update. Historic object update entries can be found in the log. Prior to chunk reclamation, the object can be recovered on the metadata level, and the historic object update is added (i.e., covering), which is very time-consuming.

To solve at least some of the above and other potential problems, an embodiment of the present disclosure provides a solution for recovering an object in a storage system. This solution includes parsing object metadata associated with the object from a log in the storage system and storing the parsed object metadata in the storage space. This solution further includes receiving a request to recover the object, and in response to the receiving the request, retrieving the parsed object metadata from the storage space. This solution further includes reestablishing a linkage to a chunk corresponding to the object based on the retrieved object metadata. In this way, space reclamation is not impacted during recovery for the object, thereby increasing the space utilization. Furthermore, the time spent in the recovery process is reduced, and the success rate of object recovery is increased.

The basic principles and some example implementations of the present disclosure are illustrated below with reference to FIG. 1 to FIG. 9. It should be understood that these example embodiments are given only to enable those skilled in the art to better understand and thus implement the embodiments of the present disclosure, and are not intended to limit the scope of the present disclosure in any way.

FIG. 1 illustrates a schematic diagram of an example object storage system 100 in which a method and/or a process according to embodiments of the present disclosure can be implemented. Unless specifically stated, the abbreviation "storage system" or "system" used below refers to the object storage system. The storage architecture of the object storage system 100 and the mechanism of data storage therein will be described in further detail below.

The object storage system 100 according to an embodiment of the present disclosure can be configured to extract the data into an object for storage, management, etc. The object storage system 100 uses a particular method for disk capacity management and is substantially independent of the file system, and the entire disk space is divided into a group of large blocks of a fixed size that are called chunks. All the user data is stored in the chunk. A chunk may contain data segments of several objects. From the perspective of a low layer, an object is generally represented as a group of data segments stored in different chunks.

As shown in FIG. 1, an object 110 extracted from the user data corresponds to the data segments (shown in the hatched areas) stored in the chunks 121, 122, and 123 respectively, and these chunks 121, 122, and 123 correspond to the underlying physical storage devices 131, 132, and 133. The underlying physical storage devices 131, 132, and 133 (e.g., HDD or SSD) may be deployed locally or deployed on the cloud in a distributed manner.

For ease of illustration and explanation, description is made with respect to an object (i.e., the object 110) in FIG. 1, and the object storage system 100 can of course operate on (such as store and manage) a greater number of objects. FIG. 1 schematically shows that the data segments corresponding to the object 110 are stored in three chunks (i.e., the chunks 121, 122, and 123), but this is not limiting. The data segments corresponding to the object 110 can be stored in a greater or smaller number of chunks, and the arrangement (e.g., the size, position, etc. thereof) of these data segments in various chunks can be specifically set depending on various factors (e.g., capacity). The correspondence between the object and the chunk and between the chunk and the underlying physical storage device (illustrated by the arrows) as shown in FIG. 1 is also exemplary, and other different correspondences may exist therebetween. Furthermore, the underlying physical storage devices may be of the same type or of different types, and embodiments of the present disclosure are not limiting in this respect.

In addition, the metadata of the object of the object storage system 100 indicates 1:1 mapping between the object and the chunk. The object storage system 100 also compresses object updates into an index through index compression. As a result, when the object is deleted subsequent to index compression, previous updates will be removed, only limited information is retained, and detailed information about object-chunk mapping will be lost. By way of example and not limitation, the metadata information of the object of the object storage system 100 may be stored in the inner storage space, e.g., the object target table (OB DT), which belongs to a part of the object table key.

The object storage system 100 may be based on the log and enables only addition, that is, it does not enable direct modification or deletion. All the user operations are first written into the logs (also called logging) by adding, and these logs are written into the disk in the form of triple-mirror chunks. These log chunks may be used to retrieve the object updates.

The schematic diagram of the example environment 100 in which the method and/or process according to embodiments of the present disclosure can be implemented has been described above in conjunction with FIG. 1. A flow chart of a method 200 for recovering an object in the storage system 100 according to an embodiment of the present disclosure will be described below in conjunction with FIG. 2. To overcome the numerous disadvantages in related art as described above and further improve the object recovery mechanism, the method for instant recovery on the metadata level is proposed.

In the block 210, the object metadata associated with the object is parsed from a log in the storage system 100. According to an embodiment of the present disclosure, the parsing process occurs prior to the recovery process. In other words, the metadata associated with the object is parsed in advance from the log (for example, at a preset frequency of once a day, once a week, etc.), and every time the need for object recovery occurs, corresponding object metadata can be directly found. In some embodiments, the parsed object metadata can include updates to the object metadata indicating operations directed at the object and the like.

In the block 220, the parsed object metadata is stored in the storage space. Prior to recovery for the object, the object metadata parsed from the log is stored in the storage space capable of rapid retrieval for object recovery, such as the Hash storage space and the tree storage space. The Hash storage space and the tree storage space are storage spaces of a data structural organization, such as the Hash table or binary tree, and provide respectively the time complexities of $O(1)$ and $O(\log N)$. As such, according to an embodiment of the present disclosure, it is not necessary to stop space reclamation during recovery for the object.

In some embodiments, the storage space may be in the storage system 100 or another storage system different from the storage system 100. The storage space for storing object metadata parsed from the log can be configured in the storage system 100 for performing recovery for objects. In some embodiments, some reserved space can always be present in the object storage system 100 for storing the parsed object metadata. Furthermore, this storage space can be configured in another different storage system to improve the data reliability and reduce operation conflicts.

In the block 230, a request to recover the object is received. Such a recovery request may be sent from a user or initiated spontaneously by the system in, for example, in the case of loss of object-chunk reference. In some embodiments, such a request may include an object table containing the objects to be recovered and the retrieval or filter condition for these objects.

In the block 240, in response to receiving the request, the parsed object metadata is retrieved from the storage space. Before performing the recovery for the object, the object metadata needed has already been parsed in advance from the log and stored in the dedicated storage space. Therefore, when performing the recovery for the object, the object metadata corresponding to the object to be recovered can be accessed directly from the storage space without having to start over to parse the entire log, which is very time consuming.

In the block 250, a linkage to a chunk corresponding to the object is reestablished based on the retrieved object metadata. Due to the asynchronous design of the object storage system 100, when an object is deleted, it does not mean that the deleted object is unrecoverable. Based on the object metadata associated with the object to be recovered that is directly retrieved from the storage space, the linkage to the chunk corresponding to the targeted object can be reestablished. The object can be recovered from the user's perspective.

With the method 200 for recovering an object in the storage system 100 according to an embodiment of the present disclosure, other services or operations of the storage system, such as space reclamation, are not impacted during recovery for the object. Furthermore, the time spent in the recovery process is reduced, and thus the success rate of object recovery is increased. In the following, object recovery according to embodiments of the present disclosure will be described in further detail.

Figure 3:
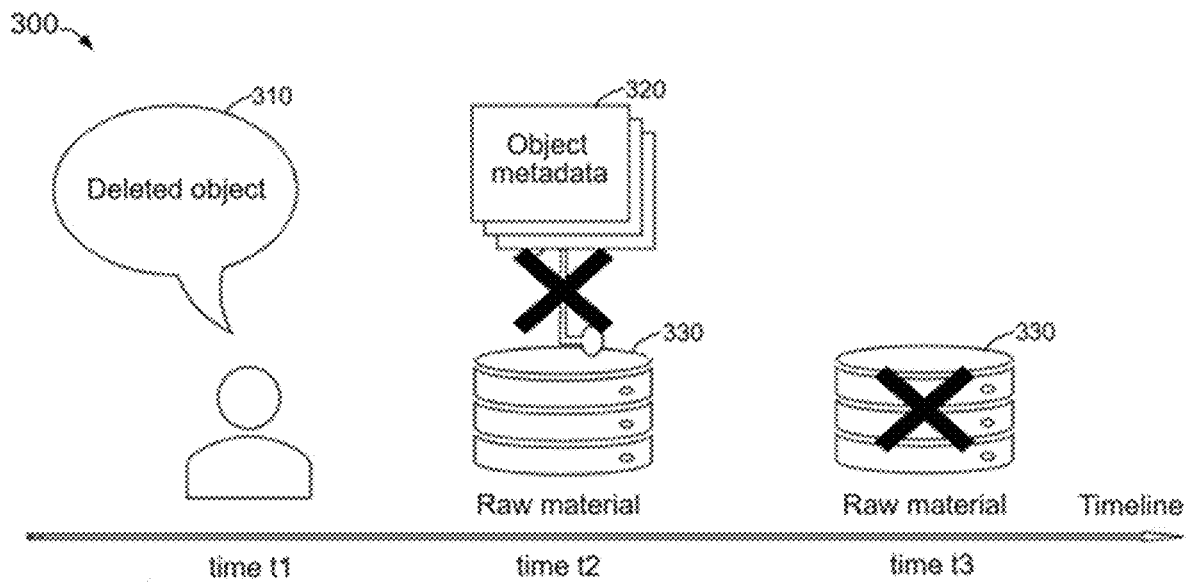
FIG. 3 is a timing diagram illustrating a time frame for object recovery according to an embodiment of the present disclosure.

FIG. 3 is a timing diagram 300 illustrating a time frame for object recovery according to an embodiment of the present disclosure. As described above, the object storage system 100 according to embodiments of the present disclosure is based on logs and enables only addition. When an object is deleted, it does not necessarily mean that the deleted object is unrecoverable. This is because the asynchronous design of the object storage system 100 causes delay between a customer operation (e.g., deletion) and a system operation (object metadata index compression and chunk clearing). Such an asynchronous mechanism will be described in detail below in conjunction with FIG. 3.

As shown in FIG. 3, at the time t1, the user issues an instruction 310 to delete an object, and the object is deleted. At the time t2, in response to deletion of the object, its object metadata is updated. At this time, the raw data corresponding to the deleted object on the disk is not really cleared. In other words, from t1 to t2, what is deleted is only the reference from the object metadata of the deleted object to the raw data corresponding to the deleted object on the disk, and once this reference is retrieved, the object will be recovered. However, at t3, the raw data on the disk is cleared in response to the reclamation mechanism of the system, whereupon the object becomes unrecoverable.

According to an embodiment of the present disclosure, in the case where the object to be recovered is a deleted object, in response to receiving the request to recover the object, it can be determined whether the current time is within the time period between the first time when the deleted object was deleted and the second time when the chunk corresponding to the deleted object is reclaimed. Recovery for the deleted object can be performed based on determination that the current time is within the time period between the first time and the second time. Furthermore, an indicator of incapability of recovery can be returned based on determination that the current time is after the second time. As such, the recovery operation can be performed based on the time frame for object recovery, thereby avoiding unnecessary wastage of computing power. It is to be noted that in the case where the object to be recovered is another type of object, the operation of determining the time frame or time interval is the same as or similar to that described above, and description thereof will not be repeated here.

As described above, the object metadata parsed in advance from the log may include updates to the object metadata indicating operations directed to the object or the like. By way of example, updates to the object metadata may indicate creation, modification, deletion, recovery, etc. of the object as well as the times corresponding to these operations. Meanwhile, updates to the object metadata may also identify the object and the corresponding user data segments.

Figure 4:
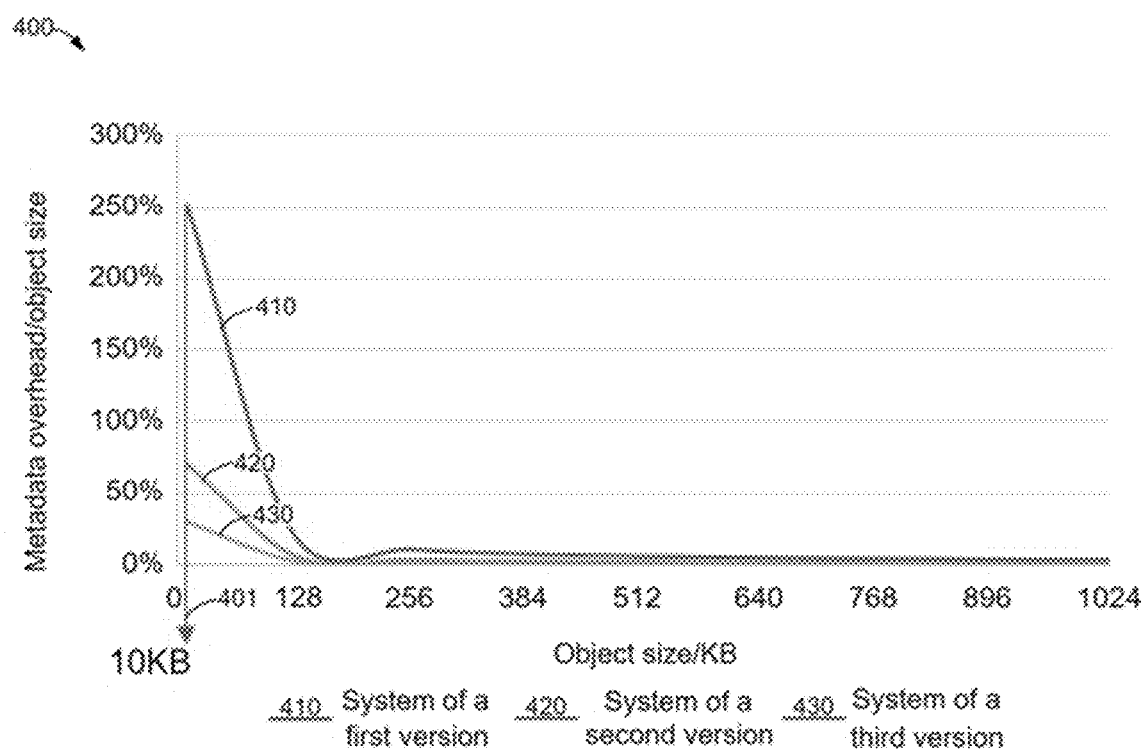
FIG. 4 is a schematic diagram illustrating metadata overhead according to an embodiment of the present disclosure.

Moreover, according to an embodiment of the present disclosure, storage consumption of updates to the object metadata (hereinafter, also briefly called object updates) can be further optimized, where the storage consumption depends on the type of the storage device. FIG. 4 is a schematic diagram 400 illustrating metadata overhead according to an embodiment of the present disclosure that shows results of laboratory testing. The storage consumption strategy according to embodiments of the present disclosure is described below in conjunction with FIG. 4.

As shown in FIG. 4, the horizontal axis in the schematic diagram 400 represents the size of the object in the unit of KB, and the vertical axis represents the metadata overhead/size of the object, indicating the metadata overhead. The curve 410 refers to a system of a lower version, the curve 420 refers to a system of a higher version, and the curve 410 refers to a system of an even higher version. The arrowed straight line 401 indicates that the size of the object is 10 KB here. As can be seen from FIG. 4, the ratio of metadata overhead/size of the object at 401 of the systems of different versions indicated by the curves 410, 420, and 430 is all unideal or undesirable.

However, as can be further observed from FIG. 4, if the size of the object is greater than 128 KB, the metadata overhead/size of the object will be within a relatively good range. Based on laboratory testing, the compressed updates to the object metadata include about 815 bytes, and therefore, these compressed updates to the object metadata are scheduled to be merged into a larger file, in order to avoid unnecessary metadata headers.

According to an embodiment of the present disclosure, updates to the object metadata are compressed into an updated object. The parsed updates to the object metadata can be converted into a compressed updated object (also called data object) that contains only necessary information of the object, which reduces the capacity overhead for recovery.

By way of example and not limitation, in the case of, e.g., 1,000,000 updates to the object metadata, each update to the object metadata has a size of, e.g., about 815 bytes after compression. If 200 object updates are merged into 1 object which is uploaded to the object storage system 100, then only, for example, 15.81 MB is needed. If 1,000,000 updates to the object metadata are directly uploaded, then, for example, 2.8621 GB is needed, causing most of the capacity consumption to be occupied by the metadata overhead, which needs to be avoided.

According to an embodiment of the present disclosure, the updated object can be stored in the storage space and managed according to the retention strategy which indicates that the updated object is retained for a preset time period and is deleted in response to expiration of the preset time period.

A retention strategy may also be configured for the backup data to further improve the overhead. For example, updates to the object metadata can be stored in storage buckets in the object storage system 100 according to the S3 protocol. When these updates are not needed any more, they can be deleted, and a standard space reclamation procedure is followed. Hereinafter, more strategy configurations according to embodiments of the present disclosure will be described.

The strategy configurations according to embodiments of the present disclosure may include a system strategy and a user strategy. The system strategy, also called a system configuration, describes operation in the background. The system strategy can designate the backup storage space to store the object metadata, that is, the storage space to store the object metadata parsed from the log as described above. Such backup storage space may be external storage space or internal storage space, and may be used to support reading and writing of the object metadata to be retained. Moreover, the system strategy may designate access details.

According to an embodiment of the present disclosure, the system strategy may further provide a scheduler that is configured to control the frequency at which other components of the system run at configurable time intervals. In some embodiments, the frequency at which the updates to the object metadata are to be parsed from the log can be determined based on the system strategy, and the updates to the object metadata are parsed from the log at the determined frequency by, for example, a recovery element or other components. It is to be noted that the scheduler or recovery element described herein may be based on services and may be implemented through execution of executable program code stored in a memory by a processor, or may be a hardware component, and embodiments of the present disclosure are not limiting in this respect. Operations of the recovery element will be described in further detail below.

The user strategy, also called user configuration, describes the targeted object metadata to be filtered, processed, and saved in the backup storage space described above. In other words, it indicates the filter condition for the targeted object metadata. In some embodiments, the user strategy may indicate at least one of: replication group information, namespace, bucket name, object name, default metadata key and value, or custom metadata key and value.

In some embodiments, conditions indicated by the user strategy may be grouped. For example, the strategy set A may include "bucket name: fruit" and "object name: apple," and the strategy set B may include "replication group: color," "bucket name: green," and "object name: grass." The process of parsing metadata updates from the log and storing them in advance will be described in further detail below in conjunction with FIG. 5.

Figure 5:
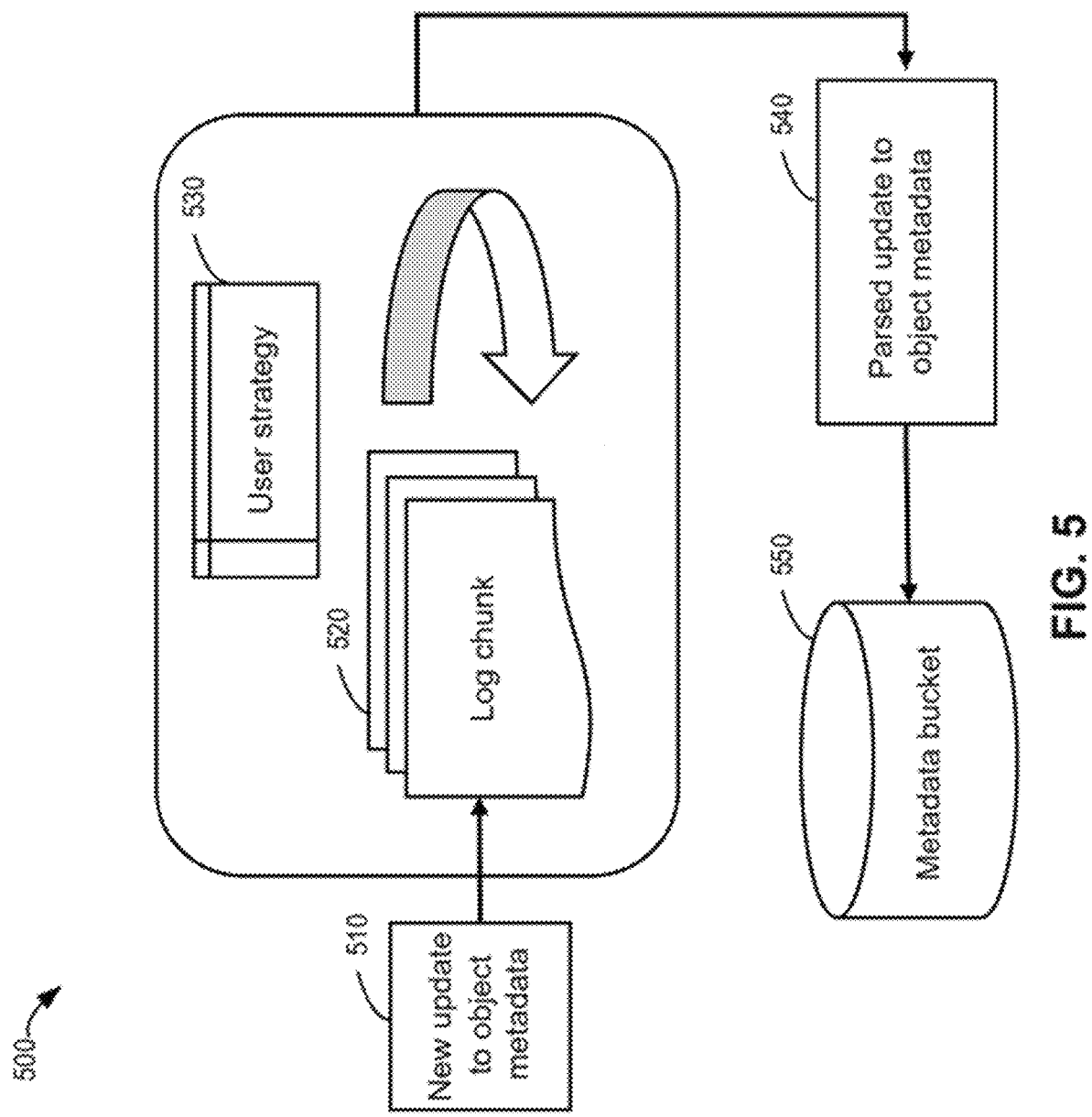
FIG. 5 is a schematic diagram illustrating a process of parsing for metadata updates according to an embodiment of the present disclosure.

FIG. 5 is a schematic diagram illustrating a process 500 of parsing for metadata updates according to an embodiment of the present disclosure. As described above, since the system is based on logs, operations directed to the object will be recorded in the log, such as a log in the form of a chunk. According to an embodiment of the present disclosure, in response to occurrence of an operation directed to the object, new updates to the object metadata 510 will be recorded in the log chunk 520 in the object storage system 100. As such, historic object metadata update entries can be found in the log.

Figure 6:
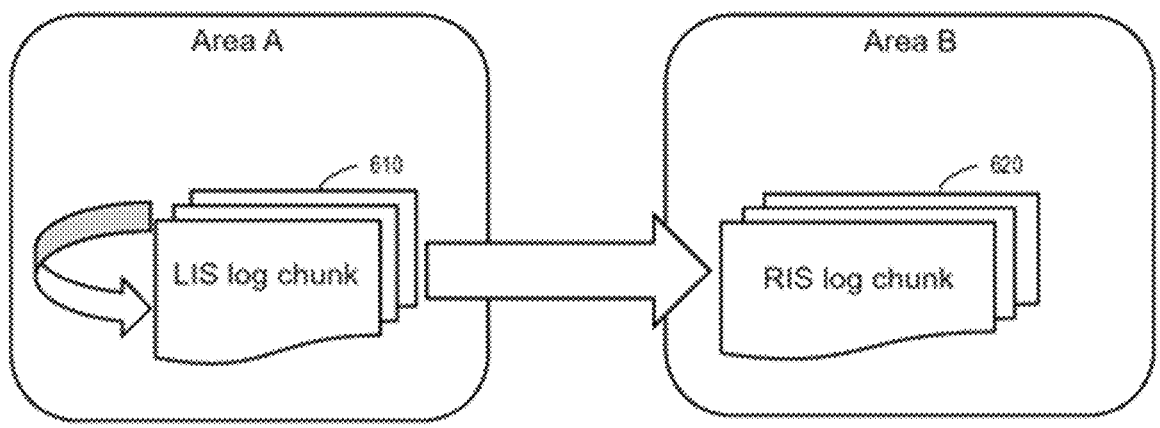
FIG. 6 is a schematic diagram illustrating distributed arrangement of a log according to an embodiment of the present disclosure.

According to an embodiment of the present disclosure, the log may be distributed in a local area and a remote area. The distributed arrangement of the log is described here in conjunction with FIG. 6. FIG. 6 is a schematic diagram illustrating distributed arrangement 600 of a log according to an embodiment of the present disclosure. As shown in FIG. 6, some log chunks are distributed in a local area (e.g., area A). The log chunks distributed in the local area A may include a Local Index Store (LIS) log chunk 610 that includes a LIS metadata log. Moreover, some logs are distributed in a remote area (e.g., area B). The log chunks distributed in the remote area B may include a Remote Index Store (RIS) log chunk 620 that includes a RIS metadata log.

Referring back to FIG. 5, according to an embodiment of the present disclosure, for example, in response to the request to recover the object, the updates to the object metadata corresponding to the object to be recovered are parsed from the log chunk 520 based on the user strategy 530, that is, the parsed updates to the object metadata 540 as shown in FIG. 5. In some embodiments, this request may include the user strategy 530 to indicate conditions for filtering out an object from the log chunk 520. As such, by using the log recording mechanism, log content can be filtered depending on the filter conditions defined in the user strategy 530.

In the case of the distributed arrangement of the log as described above, according to an embodiment of the present disclosure, the log entries satisfying the user strategy 530 can be filtered out from both the local area and the remote area. The log entries may include the write type, the Schema key, the timestamp, the log payload length, and the like, and may further include several key details, such as the object creation time, the object bucket, the object name, the object namespace, the time of previous object modification, and the like.

According to an embodiment of the present disclosure, the parsed updates to the object metadata 540 can be stored in the metadata bucket 550. When the filter conditions (one or more of the filter conditions or all the filter conditions) are satisfied, the log entries will be parsed and uploaded to the backup storage space. In the case where the storage space is Hash storage space, the entries can be stored in the metadata bucket 550 in the storage space. These log entries will be used in the process of recovery. The process of recovery will be described below in conjunction with FIG. 7.

Figure 7:
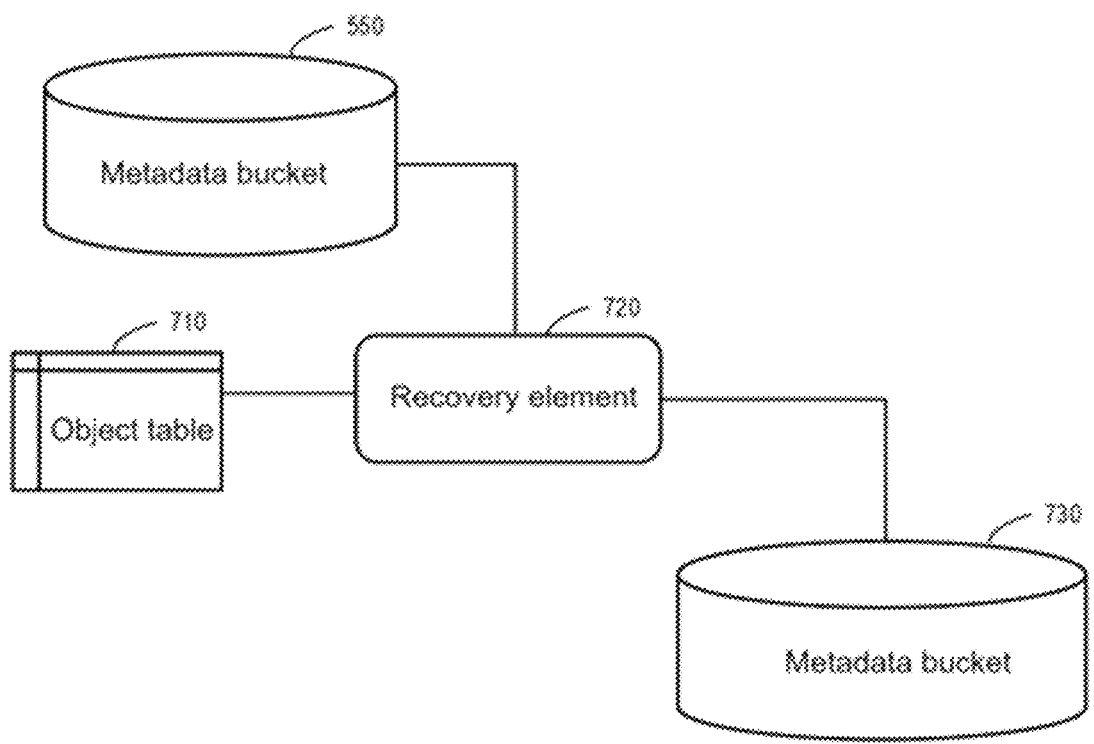
FIG. 7 is a schematic diagram illustrating a process of recovery for an object according to an embodiment of the present disclosure.

FIG. 7 is a schematic diagram illustrating a process of recovery 700 for an object according to an embodiment of the present disclosure. The process of recovery 700 for the object is based on the object table provided (by, for example, the user). This object table 710 may be included in the request to recover the object and indicate the object to be recovered. For example, the object table 710 may include a storage bucket name and object name information which are used to find the updates to the object metadata that are previously stored. As shown above, the updates to the object metadata that have been parsed based on the user strategy can be pre-stored in the backup storage space.

In the case where the backup storage space is the Hash storage space, the parsed updates to the object metadata may be pre-stored in the metadata bucket 550. Upon receiving the object table 710, the recovery element 720 according to an embodiment of the present disclosure can retrieve the updates to the object metadata associated with the object to be recovered from the metadata bucket 550. The retrieved updates to the object metadata associated with the object to be recovered can be inserted by the recovery element 720 in the user bucket 730 to cover the historic updates to the object metadata, thereby accomplishing object recovery.

According to an embodiment of the present disclosure, in response to the object table 710 being updated, such as increase of the number of the objects to be recovered (i.e., there are new objects to be recovered), the log can be parsed only once based on a checkpoint to obtain the newer update to the object metadata. This process of parsing may be based on the user strategy. The checkpoint may indicate the parsing history, e.g., the progress of the previous log parsing, so that the next parsing can start directly from this checkpoint, without having to start over. Moreover, as a certain amount of parsed updates to the object metadata has been stored in the backup storage space, even when the object table 710 is updated, only one parsing of the log suffices to obtain the newer update to the object metadata. It is to be noted that the checkpoint mechanism can be introduced not only in the case where the object table 710 is updated, but also each time of parsing in log parsing according to an embodiment of the present disclosure, so as to improve the time and computing power cost.

Figure 8:
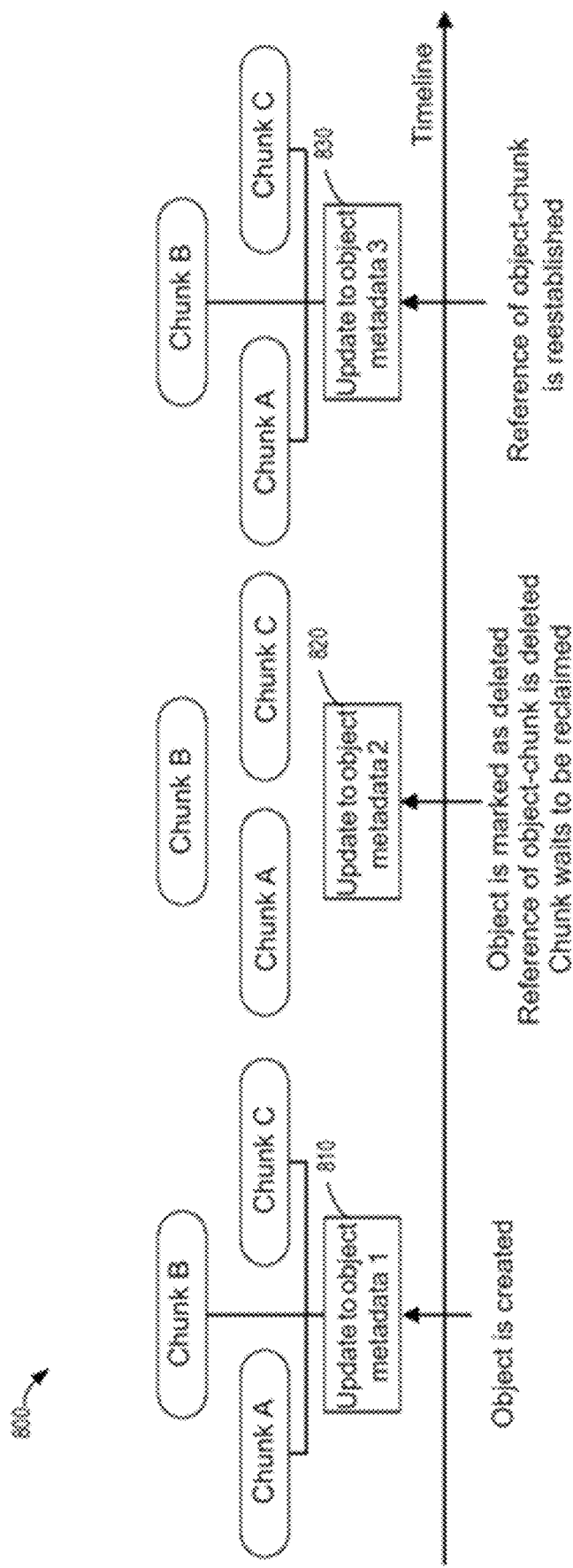
FIG. 8 is a timing diagram illustrating reestablishment of a linkage to a chunk according to an embodiment of the present disclosure.

FIG. 8 is a timing diagram 800 illustrating reestablishment of a linkage to a chunk according to an embodiment of the present disclosure. As shown in FIG. 8, the update to the object metadata 1 810 may indicate that the object is created, and based on the update to the object metadata 1 810, the chunk A, chunk B, and chunk C, for example, corresponding to the object are linked together, where data segments of this object are stored in the chunk A, chunk B, and chunk C.

At the next time shown in FIG. 8, the update to the object metadata 2 820 may indicate that the object is deleted. At this time, this object is marked as deleted, and reference of the object-chunk is deleted, while the chunk A, chunk B, and chunk C are waiting to be reclaimed. Before reclamation of the chunk A, chunk B, and chunk C, there is still a chance to recover the object.

The update to the object metadata 3 830 may indicate that the object is recovered. The retrieved update to the object metadata 3 830 will cover the historic metadata update, and based on the update to the object metadata 3 830, the reference of object-chunk can be reestablished. As shown in FIG. 8, the linkages to chunk A, chunk B, and chunk C are reestablished. When the linages to the chunks corresponding to the object are added back, the object can be regarded as recovered.

According to an embodiment of the present disclosure, recovery for the object can be verified, and a report can be generated to indicate whether the object has been recovered based on the result of recovery for the object. Such a verification mechanism can verify whether the object has been successfully recovered, and provide a verification report to be recorded, for example, in the log.

An instant recovery of object on the metadata level is provided according to embodiments of the present disclosure. With the technical solutions according to embodiments of the present disclosure, the object metadata can be parsed in advance from the log and securely stored in the backup storage space, so that the log parsing result is reusable. In this way, space reclamation is not impacted during recovery for the object, thereby increasing the space utilization. Furthermore, the time spent in the recovery process is reduced, and the success rate of object recovery is increased.

Figure 9:
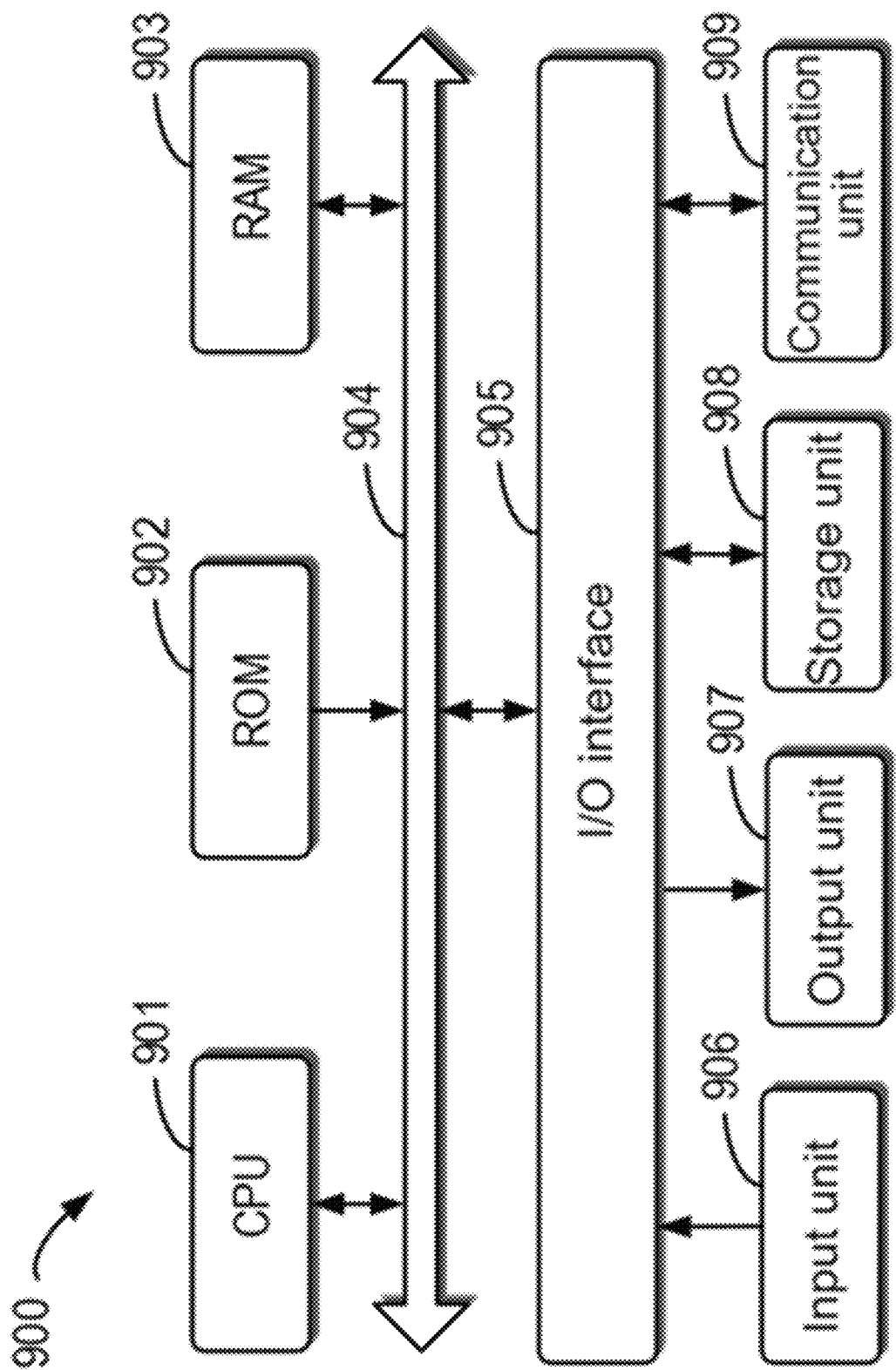
FIG. 9 illustrates a schematic block diagram of an example device that may be used for implementing embodiments of the present disclosure.

FIG. 9 illustrates a schematic block diagram of an example device 900 that may be used to implement some embodiments of the present disclosure. As shown in FIG. 9, the device 900 includes a central processing unit (CPU) 901 that can perform various appropriate actions and processing according to computer program instructions stored in a read-only memory (ROM) 902 or computer program instructions loaded from a storage unit 908 into a random access memory (RAM) 903. Various programs and data required for the operation of the device 900 may also be stored in the RAM 903. The CPU 901, the ROM 902, and the RAM 903 are connected to one another through a bus 904. An input/output (I/O) interface 905 is also connected to the bus 904.

A plurality of components in the device 900 are connected to the I/O interface 905 and include: an input unit 906, such as a keyboard, a mouse, and the like; an output unit 907, such as various types of displays, speakers, and the like; a storage unit 908, such as a magnetic disk, an optical disc, and the like; and a communication unit 909, such as a network card, a modem, a wireless communication transceiver, and the like. The communication unit 909 allows the device 900 to exchange information/data with other devices via a computer network such as the Internet and/or various telecommunication networks.

The various processes and processing described above, such as the method 200, may be performed by the processing unit 901. For example, in some embodiments, the method 200 may be implemented as a computer software program that is tangibly included in a machine-readable medium such as the storage unit 908. In some embodiments, part or all of the computer program may be loaded and/or installed onto the device 900 via the ROM 902 and/or the communication unit 909. When the computer program is loaded into the RAM 903 and executed by the CPU 901, one or more actions of the method 200 described above can be executed.

The present disclosure may be a method, a device, an apparatus, a system, and/or a computer program product. The computer program product may include a computer-readable storage medium on which computer-readable program instructions for performing various example embodiments of the present disclosure are loaded.

The computer-readable storage medium may be a tangible device that may maintain and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, status setting data, or source code or object code written in any combination of one or more programming languages, the programming languages including object-oriented programming languages such as Smalltalk and C++, and conventional procedural programming languages such as the C language or similar programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various example embodiments of the present disclosure.

Various example embodiments of the present disclosure are described herein with reference to flow charts and/or block diagrams of the method, the apparatus (system), and the computer program product according to the embodiments of the present disclosure. It should be understood that each block of the flow charts and/or the block diagrams and combinations of blocks in the flow charts and/or the block diagrams may be implemented by computer-readable program instructions.

These computer-readable program instructions may be provided to a processing unit of a general-purpose computer, a special-purpose computer, or another programmable data processing apparatus, thereby producing a machine, such that these instructions, when executed by the processing unit of the computer or the other programmable data processing apparatus, produce means for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored thereon includes an article of manufacture that includes instructions that implement various example embodiments of the functions/actions specified in one or more blocks in the flow charts and/or block diagrams.

The computer-readable program instructions may also be loaded to a computer, another programmable data processing apparatus, or another device, so that a series of operating steps can be performed on the computer, the other programmable data processing apparatus, or the other device to produce a computer-implemented process, such that the instructions executed on the computer, the other programmable data processing apparatus, or the other device can implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in a reverse order, which depends on involved functions. It should be further noted that each block in the block diagrams and/or flow charts as well as a combination of blocks in the block diagrams and/or flow charts may be implemented using a dedicated hardware-based system that performs specified functions or actions, or using a combination of dedicated hardware and computer instructions.

The embodiments of the present disclosure have been described above. The above description is illustrative, rather than exhaustive, and is not limited to the disclosed various embodiments. Numerous modifications and alterations are apparent to persons of ordinary skill in the art without departing from the scope and spirit of the illustrated embodiments. The selection of terms used herein is intended to best explain the principles and practical applications of the various embodiments or the improvements to technologies on the market, or to enable other persons of ordinary skill in the art to understand the embodiments disclosed herein.

What is claimed is:

1. A method, comprising:
    parsing, by a system comprising at least one processor, object metadata associated with an object from a log in the storage system, the parsing resulting in parsed object metadata;
    storing the parsed object metadata in a storage space to be later accessed when the object is to be recovered;
    receiving a request to recover the object;
    in response to receiving the request, retrieving the parsed object metadata from the storage space, the retrieving resulting in retrieved object metadata; and
    reestablishing a linkage to a chunk corresponding to the object based on the retrieved object metadata.

2. The method according to claim 1, wherein the object is a deleted object, and the method further comprising:
    in response to receiving the request, determining whether a current time is within a time period between a first time when the deleted object was deleted and a second time when the chunk corresponding to the deleted object is reclaimed; and
    one of performing recovery for the deleted object based on the current time being determined to be within the time period between the first time and the second time, or
    returning an indicator of incapability of recovery based on the current time being determined to be after the second time.

3. The method according to claim 1, wherein the object metadata comprises updates to the object metadata, and the updates to the object metadata indicate operations directed to the object, and wherein:
    the updates to the object metadata are compressed into an updated object, and the updated object is stored in the storage space and managed according to a retention policy which indicates that the updated object is retained for a specified time period and is deleted in response to expiration of the specified time period.

4. The method according to claim 3, wherein the parsing comprises parsing the updates to the object metadata from the log, and wherein the parsing the updates to the object metadata from the log comprises:
    determining a frequency at which the updates to the object metadata are to be parsed from the log based on a system policy; and
    parsing the updates to the object metadata from the log at the determined frequency.

5. The method according to claim 4, wherein the log is distributed in a local area and a remote area, and the parsing the updates to the object metadata from the log comprises:
    filtering out log entries satisfying a user policy from both the local area and the remote area.

6. The method according to claim 5, wherein the user policy indicates at least one of:
    replication group information;
    a namespace;
    a bucket name;
    an object name;
    a default metadata key and value; or
    a custom metadata key and value.

7. The method according to claim 5, wherein the storage space is a hash storage space, and the method further comprising:
    based on an object table, indicating the object to be recovered, included in the request, retrieving the updates to the object metadata associated with the object from a metadata bucket in the hash storage space; and
    inserting the updates to the object metadata in a user bucket to cover historic updates to the object metadata.

8. The method according to claim 7, further comprising:
    in response to the object table being updated, parsing the log only once based on a checkpoint identifying the parsing history to obtain newer updates to the object metadata.

9. The method according to claim 5, wherein the storage space is tree storage, and the method further comprising:
    based on an object table, indicating the object to be recovered, included in the request, retrieving the updates to the object metadata associated with the object from a metadata bucket in the tree storage; and
    inserting the updates to the object metadata in a user bucket to cover historic updates to the object metadata.

10. The method according to claim 1, wherein:
    the storage space is in the storage system or another storage system different from the storage system.

11. A device, comprising:
    a processor; and
    a memory coupled to the processor and having instructions stored thereon which, when executed by the processor, cause the device to perform actions, comprising:
    prior to receiving any request to recover an object,
        parsing object metadata associated with the object from a log in the storage system, resulting in parsed object metadata, and
        storing the parsed object metadata in the storage space;
    receiving a request to recover the object;
    in response to receiving the request, retrieving the parsed object metadata from the storage space, resulting in retrieved object metadata; and
    reestablishing a linkage to a chunk corresponding to the object based on the retrieved object metadata.

12. The device according to claim 11, wherein the object is a deleted object, and the actions further comprise:
    in response to receiving the request, determining whether a current time is within a time period between a first time when the deleted object was deleted and a second time when the chunk corresponding to the deleted object is reclaimed;
    performing recovery for the deleted object based on the determining indicating that the current time is within the time period between the first time and the second time; and
    returning an indicator of incapability of recovery based on the determining indicating that the current time is after the second time.

13. The device according to claim 11, wherein the object metadata comprises updates that have been made to the object metadata, and the updates that have been made to the object metadata indicate operations that have been directed to the object, and wherein:

the updates that have been made to the object metadata are compressed into an updated object, and the updated object is stored in the storage space and managed according to a retention configuration which indicates that the updated object is to be retained for a preset time period and is to be deleted in response to expiration of the preset time period.

14. The device according to claim 13, wherein the parsing comprises parsing the updates that have been made to the object metadata from the log, and wherein the parsing the updates that have been made to the object metadata from the log comprises:
  determining a frequency at which the updates that have been made to the object metadata are to be parsed from the log based on a system configuration; and
  parsing the updates that have been made to the object metadata from the log at the determined frequency.

15. The device according to claim 14, wherein the log is distributed in a local area and a remote area, and the parsing the updates that have been made to the object metadata from the log comprises:
  filtering out log entries satisfying a user configuration from both the local area and the remote area.

16. The device according to claim 15, wherein the user configuration indicates at least one of:
  replication group information;
  a namespace;
  a bucket name;
  an object name;
  a default metadata key and value; or
  a custom metadata key and value.

17. The device according to claim 15, wherein the storage space is a hash storage space, and the actions further comprise:
  based on an object table indicating the object to be recovered included in the request, retrieving the updates that have been made to the object metadata associated with the object from a metadata bucket in the hash storage space; and
  inserting the updates that have been made to the object metadata in a user bucket to cover historic updates to the object metadata.

18. The device according to claim 17, wherein the actions further comprise:
  in response to the object table being updated, parsing the log only once based on a checkpoint identifying the parsing history to obtain newer updates to the object metadata made after the updates.

19. A computer program product that is stored on a non-transitory computer-readable storage medium and comprises computer-executable instructions which, when executed, cause a computer to perform operations, comprising:
  parsing object metadata associated with an object from a log in the storage system;
  storing the parsed object metadata in the storage space;
  after the parsing and storing have occurred, receiving a request to recover the object;
  in response to receiving the request, retrieving the parsed object metadata from the storage space; and
  reestablishing a linkage to a chunk corresponding to the object based on the retrieved object metadata.

20. The computer program product according to claim 19, wherein the storage space comprises at least one of hash storage or tree storage, wherein the object metadata comprises updates to the object metadata, and the operations further comprise:
  based on an object table indicating the object to be recovered included in the request, retrieving the updates that have been made to the object metadata associated with the object from metadata stored in the at least one of the hash storage or the tree storage.

* * * * *